US012695577B2

(12) United States Patent
Wang et al.

(10) Patent No.: US 12,695,577 B2
(45) Date of Patent: Jul. 28, 2026

(54) DCI TRIGGERED HARQ-ACK CODEBOOK RETRANSMISSION

(71) Applicant: Intel Corporation, Santa Clara, CA (US)

(72) Inventors: Yi Wang, Beijing (CN); Debdeep Chatterjee, San Jose, CA (US); Fatemeh Hamidi-Sepehr, San Jose, CA (US); Toufiqul Islam, Santa Clara, CA (US); Salvatore Talarico, Los Gatos, CA (US); Sergey Panteleev, Maynooth (IE)

(73) Assignee: Intel Corporation, Santa Clara, CA (US)

( * ) Notice: Subject to any disclaimer, the term of this patent is extended or adjusted under 35 U.S.C. 154(b) by 359 days.

(21) Appl. No.: 18/287,803

(22) PCT Filed: Sep. 28, 2022

(86) PCT No.: PCT/US2022/045021
§ 371 (c)(1),
(2) Date: Oct. 20, 2023

(87) PCT Pub. No.: WO2023/055788
PCT Pub. Date: Apr. 6, 2023

(65) Prior Publication Data
US 2024/0364479 A1     Oct. 31, 2024

Related U.S. Application Data

(60) Provisional application No. 63/276,436, filed on Nov. 5, 2021, provisional application No. 63/251,534, filed on Oct. 1, 2021.

(51) Int. Cl.
*H04L 5/00*          (2006.01)

(52) U.S. Cl.
CPC .......... *H04L 5/0055* (2013.01); *H04L 5/0048* (2013.01)

(58) Field of Classification Search
CPC ... H04L 5/0055; H04L 5/0048; H04L 1/1854; H04L 1/1896; H04L 5/0044; H04L 5/0053
(Continued)

(56) References Cited

U.S. PATENT DOCUMENTS

2020/0067574 A1* 2/2020 Yang ..................... H04L 5/0053
2021/0105102 A1 4/2021 Li et al.
(Continued)

FOREIGN PATENT DOCUMENTS

JP     2024523972     7/2024
JP     7775545     11/2025
(Continued)

OTHER PUBLICATIONS

"U.S. Appl. No. 18/287,803, Preliminary Amendment filed Oct. 20, 2023", 8 pages.
(Continued)

*Primary Examiner* — Mang Hang Yeung
(74) *Attorney, Agent, or Firm* — Schwegman Lundberg & Woessner, P.A.

(57)          ABSTRACT

A user equipment (UE) configured for Hybrid Automatic Repeat Request Acknowledgement (HARQ-ACK) codebook determination in a fifth-generation (5G) new radio (NR) network may decode a downlink control information (DCI) format received from a generation Node B (gNB). When the DCI format triggers HARQ-ACK codebook retransmission, the UE may determine a HARQ-ACK codebook to be retransmitted based on a time-offset indicated in the DCI format. To determine the HARQ-ACK codebook to be retransmitted, the UE may determine an uplink (UL) slot
(Continued)

that included an initial transmission of the HARQ-ACK codebook based on subtracting the time-offset from the DL slot that included the DCI. The UE may also encode a physical uplink control channel (PUCCH) to include the HARQ-ACK codebook determined to be retransmitted in a UL slot based on a slot offset.

5 Claims, 8 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2021/0203451 A1 | 7/2021 | Lei | |
| 2021/0234643 A1 | 7/2021 | Wang et al. | |
| 2021/0258107 A1 | 8/2021 | Khoshnevisan et al. | |
| 2022/0330307 A1* | 10/2022 | Korhonen | H04L 1/1854 |
| 2023/0113163 A1 | 4/2023 | Takahashi et al. | |

FOREIGN PATENT DOCUMENTS

| | | |
|---|---|---|
| WO | 2015056947 | 4/2015 |
| WO | 2021114179 | 6/2021 |
| WO | 2021176723 | 9/2021 |
| WO | 2022029627 | 2/2022 |
| WO | 2023047553 | 3/2023 |
| WO | WO-2023055788 A1 | 4/2023 |

OTHER PUBLICATIONS

"International Application Serial No. PCT US2022 045021, International Preliminary Report on Patentability mailed Apr. 11, 2024", 7 pgs.

"Japanese Application Serial No. 2023-567998, Notification of Reasons for Refusal mailed Nov. 19, 2024", w English translation, 8 pgs.

"3rd Generation Partnership Project;Technical Specification Group Radio Access Network;NR;Physical layer procedures for control (Release 17)", 2.3GPP TS 38.213 V17.1.0, [Online]. Retrieved from the Internet: URL:https:www. 3gpp.org ftp Specs archive 38_series 38.213 38213 -hIO.zip 20, (Jan. 8, 2022), 247 pgs.

"3rd Generation Partnership Project;Technical Specification Group Radio Access Network;NR;Radio Resource Control (RRC) protocol specification(Release 17)", 3GPP TS 38.331 V17.0.0, [Online]. Retrieved from the Internet: URL:https: www. 3gpp. org ftp Specs archive 38_series 38.331 38331-h00.zip, (Jan. 19, 2022).

"European Application Serial No. 22877244.8, Extended European Search Report mailed Feb. 10, 2025", 9 pgs.

Nokia, Shanghai Bell, "HARQ ACK Feedback Enhancements for URLLC IIoT", R1-2106636 3GPP TSG RAN WG1 106e eMeeting, [Online]. Retrieved from the Internet: https: www.3gpp.org ftp TSG_RAN WG1_RL1TSGR1_106-e Docs R1-2106636.zip, (Aug. 6, 2021), 29 pgs.

"International Application Serial No. PCT/US2022/045021, International Search Report mailed Jan. 20, 2023", 3 pgs.

"International Application Serial No. PCT/US2022/045021, Written Opinion mailed Jan. 20, 2023", 5 pgs.

ZTE, "Discussion on HARQ-ACK enhancements for eURLLC", R1-2108840, 3GPP TSG RAN WG1 Meeting, (Sep. 30, 2021), 29 pgs.

"Japanese Application Serial No. 2023-567998, Response Filed Feb. 17, 2025 to Notification of Reasons for Refusal mailed Nov. 19, 2024", w English Claims, 40 pgs.

"Japanese Application Serial No. 2023-567998, Final Notification of Reasons for Rejection mailed May 13, 2025", W English Translation, 10 pgs.

Moderator (Nokia), "Moderator summary #2 on HARQ-ACK feedback enhancements for NR Rel-17 URLLC IIoT", 3GPP TSG-RAN WG1 Meeting #106bis-e, R1-2110527, (2021), 3 pgs.

Rapporteur (Nokia), "List of agreements of Rel-17 URLLC IIoT WI (post RAN1#106bis-e)", 3GPP TSG-RAN WG1 Meeting #106bis-e, R1-2110670, (2021), 41 pgs.

"Japanese Application Serial No. 2023-567998, Response filed Aug. 13, 2025 to Final Notification of Reasons for Rejection mailed May 13, 2025", w English Claims, 10 pgs.

"European Application Serial No. 22877244.8, Response Filed Aug. 25, 2025 to Extended European Search Report mailed Feb. 10, 2025", 19 pgs.

* cited by examiner

DCI TRIGGERED HARQ-ACK CODEBOOK RETRANSMISSION

PRIORITY CLAIM

This application is a U.S. National Stage Filing under 35 U.S.C. 371 from International Application No. PCT/US2022/045021, filed Sep. 28, 2022 and published in English as WO 2023/055788 on Apr. 6, 2023, which claims the benefit of priority to U.S. Provisional Patent Application Ser. No. 63/251,534, filed Oct. 1, 2021 [reference number AD9328-Z], and U.S. Provisional Patent Application Ser. No. 63/276,436, filed Nov. 5, 2021 [reference number AE0155-Z], each of which is incorporated herein by reference in its entirety.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments relate to ultra-reliable low-latency communication (URLLC).

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Current 5G NR networks are concerned with enhancing the NR technology supporting Ultra-Reliable Low Latency Communication (URLLC) and Industrial Internet-of-Things (IIoT), particularly, enhancing the Hybrid Automatic Repeat Request Acknowledgement (HARQ-ACK) feedback from a UE. One issue is retransmission of dropped or cancelled HARQ-ACK feedback.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In some embodiments, a user equipment (UE) configured for Hybrid Automatic Repeat Request Acknowledgement (HARQ-ACK) codebook determination in a fifth-generation (5G) new radio (NR) network may decode a downlink control information (DCI) format received from a generation Node B (gNB). When the DCI format triggers HARQ-ACK codebook retransmission, the UE may determine a HARQ-ACK codebook to be retransmitted based on a time-offset indicated in the DCI format. To determine the HARQ-ACK codebook to be retransmitted, the UE may determine an uplink (UL) slot that included an initial transmission of the HARQ-ACK codebook based on subtracting the time-offset from the DL slot that included the DCI. The UE may also encode a physical uplink control channel (PUCCH) to include the HARQ-ACK codebook determined to be retransmitted in a UL slot based on a slot offset. These embodiments are described in more detail below.

Some embodiments are directed to generation Node B (gNB) configured for operation in a fifth-generation (5G) new radio (NR) network. In these embodiments, for a user equipment (UE) configured for Hybrid Automatic Repeat Request Acknowledgement (HARQ-ACK) codebook determination, the gNB may determine a HARQ-ACK codebook to be retransmitted by the UE and encode a downlink control information (DCI) format for transmission the UE triggering HARQ-ACK codebook retransmission. In these embodiments, the DCI format may be encoded to include a time-offset for use by the UE to determine the HARQ-ACK codebook that is to be retransmitted. The gNB may decode a physical uplink control channel (PUCCH) that includes the retransmitted HARQ-ACK codebook. These embodiments are described in more detail below.

Figure 1A:
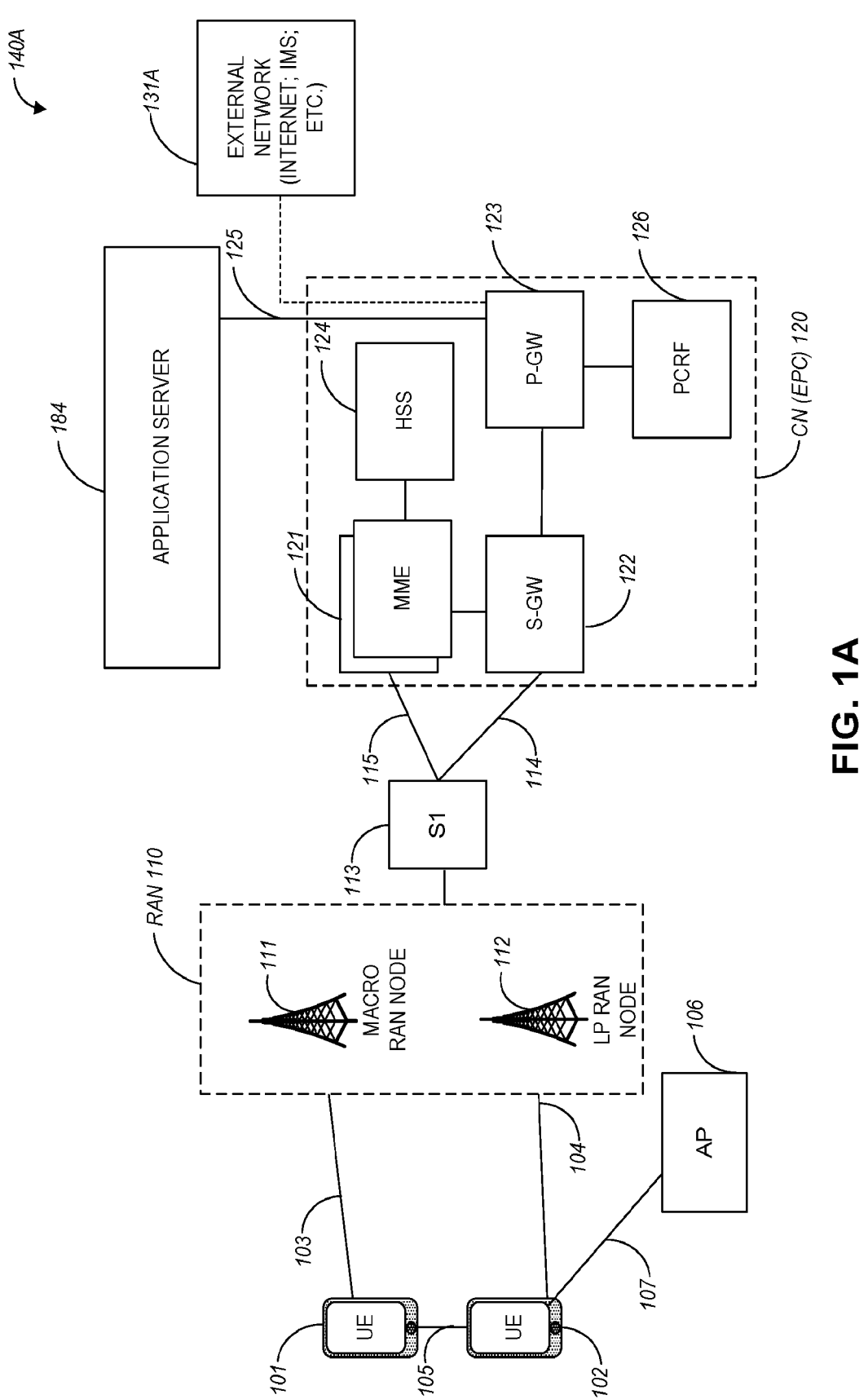
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHZ, 3.4-3.6 GHZ, 3.6-3.8 GHz, and further frequencies and Spectrum Access System (SAS) in 3.55-3.7 GHZ and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
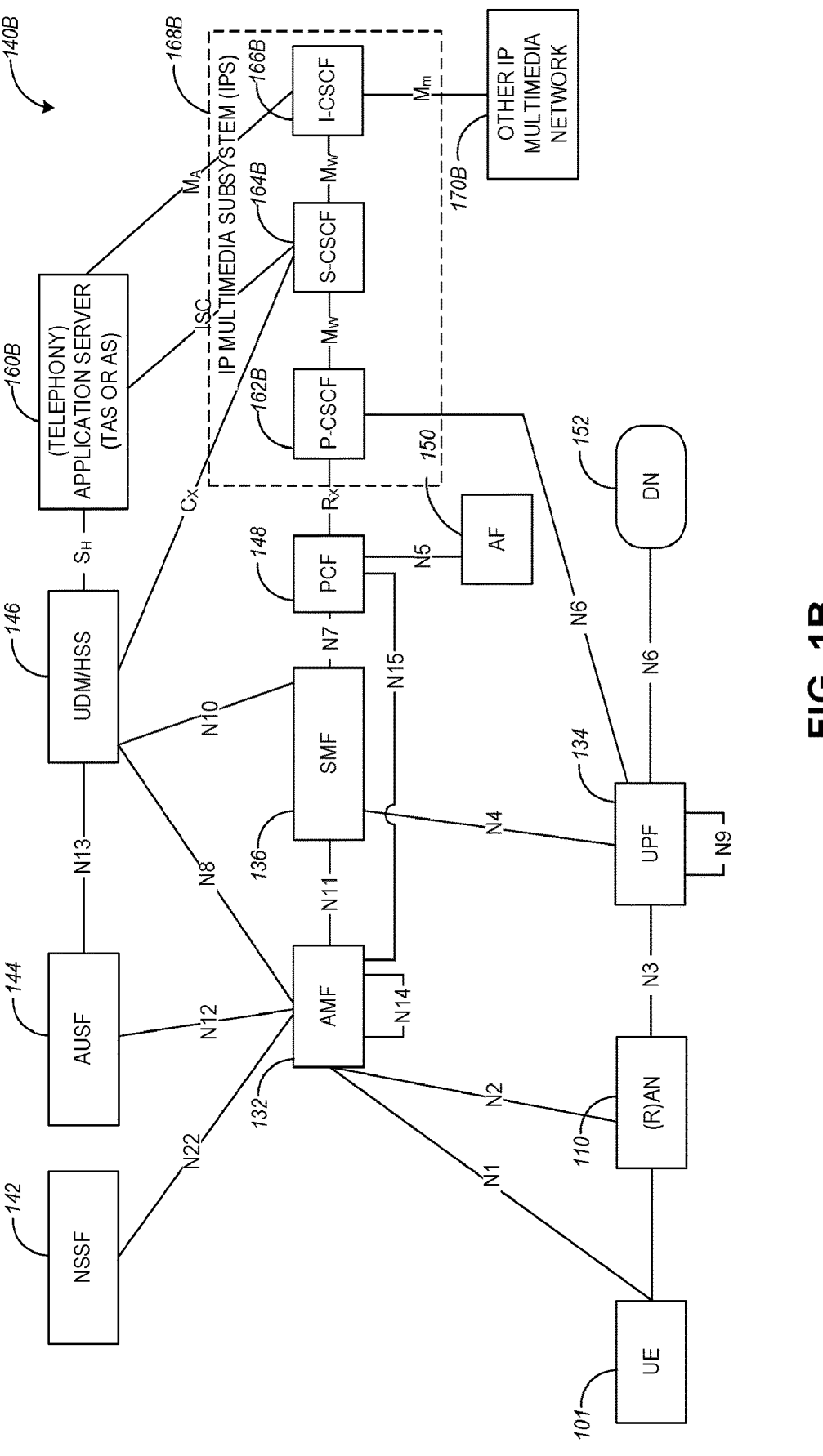
FIG. 1B and FIG. 1C illustrate a non-roaming 5G system architecture, in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

As mentioned above, one issue with enhancing the NR technology supporting Ultra-Reliable Low Latency Communication (URLLC) and Industrial Internet-of-Things (IIoT) is retransmission of dropped or cancelled HARQ feedback. The achievable latency and reliability performance of NR are keys to support use cases with tighter requirements. SPS HARQ-ACK dropping for TDD may be due to PUCCH collision with at least one DL or flexible symbol. Areas for possible solutions include:

SPS HARQ skipping for 'skipped' SPS PDSCH

PUCCH repetition enhancements (at least for HARQ-ACK), e.g., sub-slot based, etc.

Retransmission of cancelled HARQ

SPS HARQ payload size reduction and/or skipping for 'non-skipped' SPS PDSCH.

Type 1 HARQ codebook based on sub-slot PUCCH config.

PUCCH carrier switching for HARQ feedback

One of the issues to be solved is retransmission of dropped or cancelled HARQ feedback, that may happen due to:

Impossibility of mapping UCI with HARQ-ACK on available uplink symbols due to collision with semi-static or dynamic DL, SSB, CORESET #0 symbols.

Overlap with higher priority UL channel without multiplexing option enabled.

Cancellation by gNB using UL cancellation indication or other mechanism.

Another issue is related to SPS HARQ-ACK deferral. Currently, the mechanism does not handle the cases of PUCCH repetition over slots or sub-slots. The mechanism does not handle the case of SPS deferral with intra-UE multiplexing between different priorities. Embodiments disclosed herein provide:

Handling of PUCCH repetitions in case of enabled SPS HARQ-ACK deferral.

Handling of SPS HARQ-ACK deferral, when a UE is configured/indicated to perform intra-UE multiplexing between different priorities.

Handling of missed DCIs scheduling PDSCH for the case of one-shot dropped PUCCH retransmission.

SPS HARQ-ACK deferral

Repetition handling: In 3GPP RAN Working Group 1 (WG1), it has been already agreed on how to determine deferral conditions from the initial slot/sub-slot to the intermediate slot/sub-slot, and how to decide on the target slot/sub-slot. Such decisions were made under the assumption of a single PUCCH transmission over single slot/sub-slot. However, if PUCCH is operated with slot or sub-slot repetitions, further clarifications on the UE behavior are necessary. There are several issues:

Issue 1: Whether to consider only initial PUCCH repetition or all PUCCH repetitions or a sub-set of PUCCH repetitions for checking the deferral condition.

Since the deferral is checked considering all multiplexing outcomes, it seems the initial PUCCH repetition is easier for handling. Alternatively, at least one repetition from the number of repetitions may be checked for validity, i.e., if at least one repetition could be mapped into a candidate slot/sub-slot, then the deferral process is stopped. In another example, the number of repetitions to be checked for validity may be configured by higher layers from 1 up to (maximum) # of PUCCH repetitions. Further, the number of repetitions to be checked for validity may be defined relative to the total number of repetitions the PUCCH was originally scheduled or configured for, e.g., the number of repetitions to be checked for validity could be determined as floor (f*R) where 'f' is a configured or specified factor and 'R' is the total number of PUCCH repetitions. Note that requiring a UE to map all PUCCH repetitions may lead to excessive deferral and dropping in many cases.

In one example, if a UE is configured with slot-based or sub-slot based PUCCH repetitions, and is indicated with more than one PUCCH repetition, and if the corresponding SPS HARQ-ACK carried by the repetition is enabled with deferral, only conditions for mapping of the initial PUCCH repetition from the multiple PUCCH repetitions may be checked for deferral.

In another example, if a UE is configured with slot-based or sub-slot based PUCCH repetitions, and is indicated with more than one PUCCH repetition, and if the corresponding SPS HARQ-ACK carried by the repetition is enabled with deferral, conditions for mapping of all PUCCH transmission from the multiple PUCCH transmissions may be checked for deferral. I.e., only when all PUCCH repetitions can be mapped to valid UL slots/sub-slots, the deferral is not further performed.

In yet another example, if a UE is configured with slot-based or sub-slot based PUCCH repetition, and is indicated with more than one PUCCH repetition, and if the corresponding SPS HARQ-ACK carried by the repetition is enabled with deferral, conditions for mapping of each PUCCH transmission from the multiple PUCCH transmissions may be checked for deferral. The deferral is not performed when at least X PUCCH repetitions could be mapped to valid UL slots/sub-slots. Here X may be fixed to one or may be configurable from 1 up to # of PUCCH repetitions.

Issue 2: Behavior if a deferred repeated PUCCH could not be mapped to some repetitions. When the deferral stopped by fulfilling the conditions, some PUCCH repetitions could not still be mapped. Those are assumed to be dropped as per R15/16 procedures.

Issue 3: According to current specifications, when PUCCH is configured with PUCCH repetitions, the overlap of such PUCCH of different types is either not expected, or resolved by dropping one which starts later, or which has lower priority. With enabled SPS HARQ-ACK deferral, this rule may further complicate the procedure since the same starting slot/sub-slot for different UCI types may not be avoidable by scheduling due to allowed deferral.

In one example, if SPS HARQ-ACK is configured with deferral enabled, a UE does not multiplex different UCI types in a PUCCH transmission with repetitions over $$N_{PUCCH}^{repeat} > 1$$

slots. If a UE would transmit a first PUCCH over more than one slot and at least a second PUCCH over one or more slots, and the transmissions of the first PUCCH and the second PUCCH would overlap in a number of slots, then, for each slot of the number of slots and with UCI type priority of HARQ-ACK>SR>CSI with higher priority>CSI with lower priority.

When one of UCIs contain SPS HARQ-ACJ with enabled deferral, the UE can expect the first PUCCH and any of the second PUCCHs to start at a same slot and include a UCI type with same priority. In this case, one of the following dropping rules may be applied. If there are UCI of different types with the same priority, the UCI containing SPS HARQ-ACK is dropped, and the other UCI is transmitted. Or, if there are UCI of different types with the same priority, the UCI containing SPS HARQ-ACK is kept, and the other UCI is dropped.

Interaction with intra-UE multiplexing/prioritization with different priorities: In 3GPP RAN Working Group 1 (WG1), it has been already agreed a UE can be indicated with intra-UE multiplexing with different priorities. The indication can be high-layer signaling, e.g., RRC signaling, or dynamic signaling, e.g., by DCI. For overlapped UL channels with different priorities, if the intra-UE multiplexing with different priorities is indicated, UE can multiplex a UCI with priority i onto a PUCCH or PUSCH with priority j. In general, intra-UE multiplexing/prioritization between different priorities includes two steps. Step 1 resolves the overlapped UL channels with the same priority respectively, and step 2 resolves the overlapped UL channels with different priorities. The outcome of step 2 can be multiplexing of different priorities or cancellation of the low priority. For example, if in step 2, a LP (low priority, with priority index 0) PUCCH is overlapped with a HP (high priority, with priority index 1) PUCCH, and intra-UE multiplexing with different priorities is indicated, UE transmits HP PUCCH carrying both LP and HP HARQ-ACK. In another example, if in step 2, a LP PUCCH, HP PUCCH, and HP PUSCH are overlapped, and intra-UE multiplexing with different priorities is indicated, UE transmits HP PUSCH carrying both LP and HP HARQ-ACK.

For SPS with priority i configured with spsHARQdeferral (i.e. when SPS HARQ-ACK deferral is activated for the SPS configuration), a UE determines whether to defer the SPS HARQ-ACK from a first slot to a second slot, according to at least one of the rules as below:

Whether to defer the SPS is determined after step 2 (if any) of intra-UE multiplexing/prioritization.

Alt 1: For SPS HARQ-ACK with a priority i, after resolving the overlapped PUCCH/PUSCHs with different priorities (if any), and if the UE would be transmitting the SPS HARQ-ACK using the PUCCH SPS-PUCCH-AN-List-r16 or n1PUCCH-AN which is not valid, the SPS HARQ-ACK with the priority i is deferred.

In one example, if the HARQ-ACKs to be deferred includes both LP and HP HARQ-ACKs, the target slot (second slot) is separately determined for LP and HP HARQ-ACK, after performing intra-UE multiplexing/prioritization in the target slot.

Figures 2A, 2B:
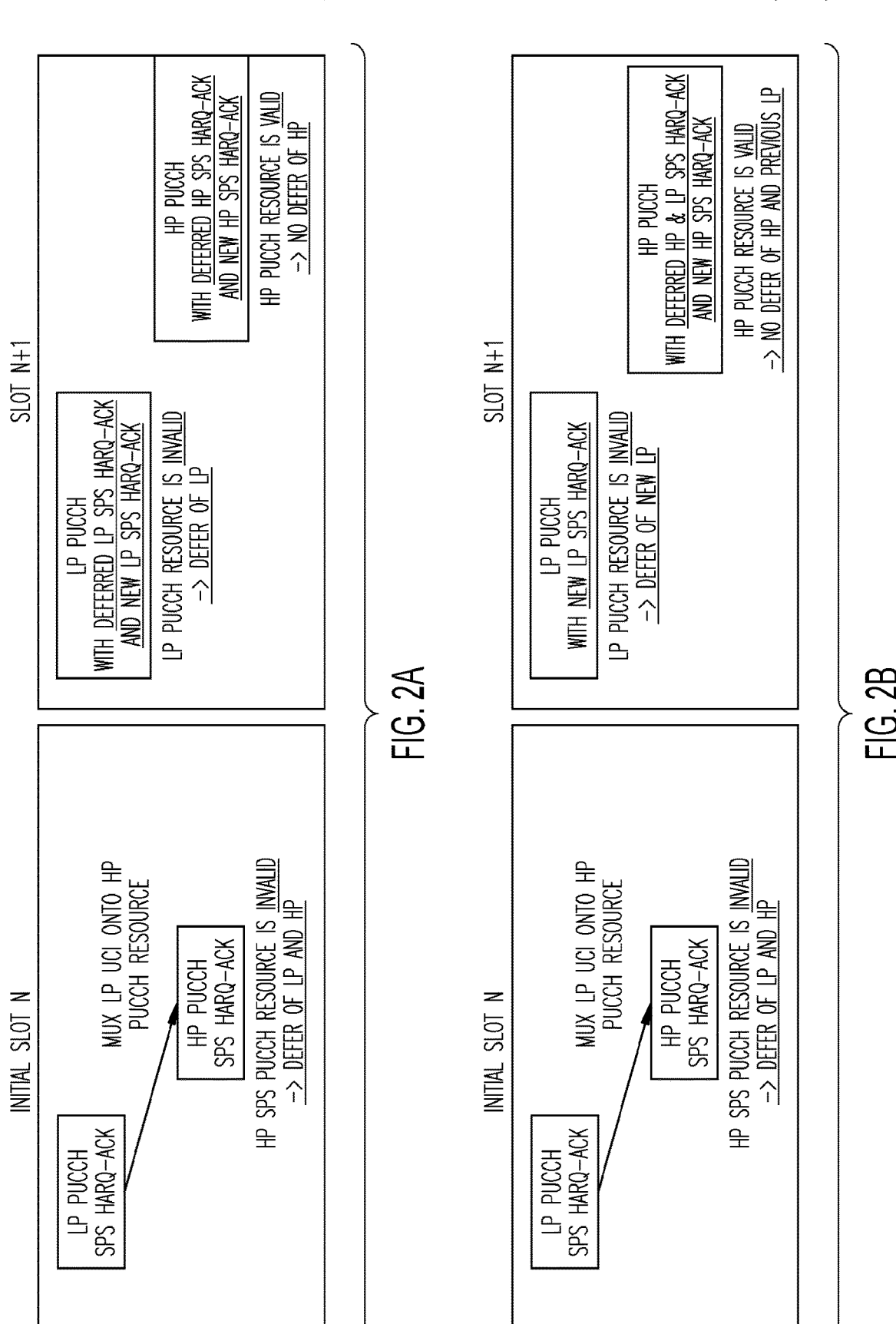
FIG. 2A is an example illustrating deferral of both low-priority (LP) and high-priority (HP) semi-persistent scheduled (SPS) HARQ-ACK to different target slots, in accordance with some embodiments.
FIG. 2B is an example illustrating deferral of both LP and HP SPS HARQ-ACK to a same target slot in which the deferred LP and HP SPS HARQ-ACK is jointly coded in the target slot, in accordance with some embodiments.

FIG. 2A provides an example. In FIG. 2A, both LP and HP SPS HARQ-ACK in slot n is deferred, but the target slot for the deferred LP and HP SPS HARQ-ACK is different. In slot n, if UE would transmit first LP SPS HARQ-ACK and first HP SPS HARQ-ACK using a HP PUCCH resource, and the HP PUCCH resource is invalid, UE determines to defer both first LP and HP SPS HARQ-ACK. To find a target slot, in slot n+1, if the LP resultant UL channel for the first LP SPS HARQ-ACK and second LP HARQ-ACK or LP UL-SCH (if any) is LP PUCCH resource which does not overlap with HP resultant UL channel for the first HP SPS HARQ-ACK and second HP HARQ-ACK or HP UL-SCH (if any), UE checks the validity of the LP resultant UL channel and the HP resultant UL channel respectively and determines whether to further defer the LP and HP SPS HARQ-ACK respectively. For example, if the HP resultant UL channel is valid while the LP resultant UL channel (LP SPS PUCCH resource) is invalid, then, slot n+1 is the target slot for first HP SPS HARQ-ACK, while slot n+1 is not the target slot for first LP SPS HARQ-ACK. UE needs to find a later slot as the target slot for the first LP SPS HARQ-ACK and second LP SPS HARQ-ACK (if any). It is noted that, LP HARQ-ACK and HP HARQ-ACK is separately coded at least when the number of bits are more than 2.

In another example, if the HARQ-ACKs to be deferred includes both LP and HP HARQ-ACKs, the target slot (second slot) is commonly determined for LP and HP HARQ-ACK, after performing intra-UE multiplexing/prioritization in the target slot. The deferred LP HARQ-ACK is jointly coded with HP HARQ-ACK in the targe slot. FIG. 2B provides an example. In FIG. 2B, both LP and HP SPS HARQ-ACK in slot n is deferred to the same target slot and the deferred LP and HP SPS HARQ-ACK is jointly coded in target slot.

Figures 2C, 3:
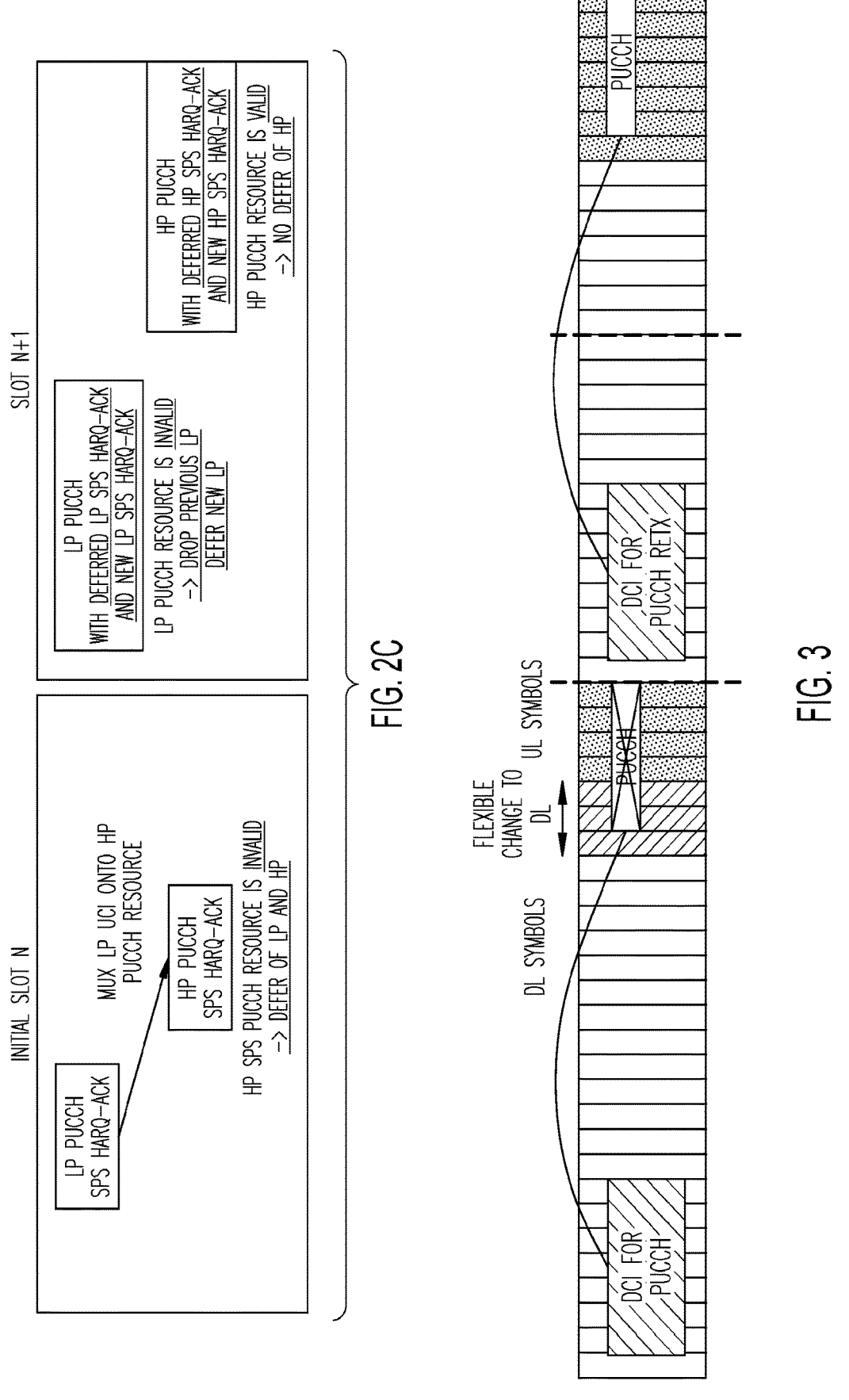
FIG. 2C is an example illustrating deferral of both LP and HP SPS HARQ-ACK to a same target slot determined by the HP SPS HARQ-ACK in which the deferred LP and HP SPS HARQ-ACK is separately coded in the target slot.
FIG. 3 illustrates physical uplink control channel (PUCCH) transmission triggered by a downlink control information (DCI) format, in accordance with some embodiments.

Alternatively, UE determines the target slot for deferred HP HARQ-ACK, and apply the target slot to LP HARQ-ACK, but UE performs the separate coding for the deferred LP and HP HARQ-ACK. In this case, if UE cannot transmit the deferred LP HARQ-ACK in the target slot, UE drops the deferred LP HARQ-ACK. FIG. 2C provides an example. In FIG. 2C, both LP and HP SPS HARQ-ACK in slot n is deferred to the same target slot determined by HP. The deferred LP and HP SPS HARQ-ACK is separately coded in target slot.

Alt 2: For SPS HARQ-ACK with a priority i, after resolving the overlapped PUCCH/PUSCHs with different priorities (if any), and if the UE would be transmitting the SPS HARQ-ACK using the PUCCH SPS-PUCCH-AN-List-r16 configured for priority i or n1PUCCH-AN configured for priority i which is not valid, the SPS HARQ-ACK with the priority i is deferred.

In this case, if there are LP SPS HARQ-ACK and HP SPS HARQ-ACK in first slot, after resolving the overlapped PUCCH/PUSCHs with different priorities, UE would be transmitting the SPS HARQ-ACK using the HP PUCCH SPS-PUCCH-AN-List-r16 or n1PUCCH-AN, and the PUCCH resource is invalid, HP SPS HARQ-ACK is deferred, while LP SPS HARQ-ACK is dropped. Though the transmission probability of LP HARQ-ACK is reduced compared with Alt 1, the implementation is simpler.

Whether to defer the SPS is determined after step 1 of intra-UE multiplexing and/or prioritization, no matter there is a following step 2 or not. For SPS HARQ-ACK with a priority i, after resolving the overlapped PUCCH/PUSCHs with same priority (step 1), and if the UE would be transmitting the SPS HARQ-ACK using the PUCCH SPS-PUCCH-AN-List-r16 with the priority i or n1PUCCH-AN with the priority i which is not valid, the SPS HARQ-ACK with the priority i is deferred.

The deferral of SPS HARQ-ACK with different priorities are separately deferred. In a slot, if there is overlapped UL channels with different priorities, and the resultant UL channel of step 2 is a valid UL channel, UE transmits the resultant UL channel with multiplexed SPS HARQ-ACKs, no matter the SPS HARQ-ACKs are determined to defer to another slot or not. Alternatively, UE transmits the resultant UL channel with multiplexed SPS HARQ-ACKs, if the SPS HARQ-ACKs is not determined to defer to another slot.

In above embodiment, the PUCCH resource is invalid, if the PUCCH resource overlaps with a symbol indicated as downlink by tdd-UL-DL-ConfigurationCommon or tdd-UL-DL-ConfigDedicated or indicated for a SS/PBCH block by ssb-PositionsInBurst or indicated for CORESET #0.

In above embodiment, if the time difference between the target slot and initial slot is larger than the maximum deferral time, the deferred SPS HARQ-ACK is dropped.

HARQ-ACK Retransmission

FIG. 3 illustrates physical uplink control channel (PUCCH) transmission triggered by a downlink control information (DCI) format, in accordance with some embodiments. One-shot triggering of HARQ-ACK retransmission assumes that a DCI indicates which PUCCH in which slot/sub-slot needs to be retransmitted (e.g., due to dynamic dropping or unsuccessful reception at gNB) as illustrated in FIG. 3. For one-shot triggering the PUCCH that needs to be retransmitted is to be indicated. The most straightforward option to indicate the CB for retransmission is to provide a time offset to the past from the DCI reception triggering the retransmission. There could be issues with the payload:

Issue 1: Due to misdetection of DCI(s) scheduling PDSCH and corresponding HARQ-ACK, the PUCCH which was dropped (or transmitted) may not be reliably constructed. When this PUCCH is requested to be retransmitted, the payload of the retransmitted PUCCH may not be known. To solve that, one or multiple of the following solutions can be applied:

In one example, for Type 2 CB, additional total DAI or continuous counter DAI may be used to derive CB size of the PUCCH in the indicated slot/sub-slot for retransmission.

In another example, for Type 2 CB, DCI with retransmission of HARQ-ACK codebook may indicate an additional time offset to past from the PUCCH resource for the new HARQ-ACK, and the UE in this case is assumed to continue the CB construction from the indicated PUCCH resource in past to the PUCCH resource in future. In other words, the UE assumes that the previous or original PUCCH resource is to be used for the retransmission, and it continues to count HARQ-ACK bits using counter DAI and total DAI including the DAIs from the DCI requesting PUCCH retransmission. In an example, the time offset may be indicated in terms of numbers of slots corresponding to the subcarrier spacing (SCS) of the active UL BWP where the PUCCH is mapped. Further, to be able to distinguish from multiple PUCCH resources in a slot that may be impacted, the reference to one of possibly multiple PUCCHs can be provided to the UE via a combination of the slot offset referring to the earlier slot and a PUCCH Resource Indication (PRI) for the indicated slot. The UE in this case may not expect that the same HARQ process ID for a CC is indicated in the new DCI and is associated with the HARQ codebook payload in the retransmitted PUCCH.

In one example, a UE may not be expected to be requested to retransmit PUCCH of a first priority by DCI indication containing a second priority, i.e., triggering of PUCCH retransmission by a DCI of a different priority is not supported.

In an example, for the same codebook type, the codebook size may still be an issue, for type-1 codebook. For type-1 codebook, there is one special case that UE only transmits 1 bit HARQ-ACK or only HARQ-ACK for SPS PDSCH, when UE does not receive any DCI, or receives only one DCI with DCI 1_0 with specific DAI value. For other cases, UE generates Type-1 codebook (typically much larger size).

One way to avoid such ambiguity is to always generate type-1 codebook for dropped PUCCH (even if UE only has SPS PDSCH HARQ-ACK to transmit, or only receives one DCI with DCI 1_0 with specific DAI value).

Issue 2: There could be a potentially rare event when gNB requests PUCCH/CB retransmission which was completely missed by the UE initially, i.e., the UE did not receive any DCI which schedule HARQ-ACK feedback in the PUCCH requested to be retransmitted. To handle that, either all information about CB type and its size needs to be provided in the triggering DCI, or the UE may assume some default parameters, or may drop transmission of this requested PUCCH.

In one example, if DCI indicates retransmission of a PUCCH in a slot/sub-slot which (from the UE perspective,) was not previously indicated by any other DCI to the UE (i.e., the UE is unaware of any PUCCH in the requested slots/sub-slot for retransmission), the UE transmits a specific/default payload in a PUCCH. For example, the UE transmits Type 1 CB of one-bit with NACK payload. Alternatively, UE transmits Type 1 or Type 2 CB with all NACKs.

In one example, if DCI indicates retransmission of a PUCCH in a slot/sub-slot which (from the UE perspective,) was not previously indicated by any other DCI to the UE (i.e., the UE is unaware of any PUCCH in the requested slots/sub-slot for retransmission), the UE assumes NULL codebook for the retransmitted PUCCH, and only transmits the new HARQ-ACK if DCI schedules PDSCH. The gNB should take this information into account, and e.g. do hypothesis testing. If detected, then can understand whether PUCCH was dropped or DCI was not received.

Figure 4:
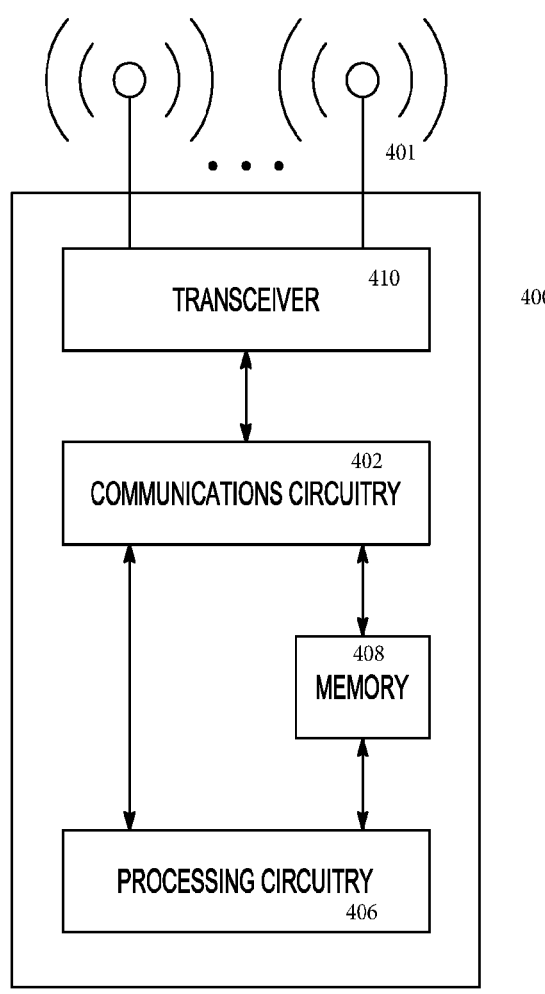
FIG. 4 illustrates a functional block diagram of a wireless communication device, in accordance with some embodiments.

FIG. 4 illustrates a functional block diagram of a wireless communication device, in accordance with some embodiments. Wireless communication device 400 may be suitable for use as a UE or gNB configured for operation in a 5G NR network. The communication device 400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 400 may include communications circuitry 402 and a transceiver 410 for transmitting and receiving signals to and from other communication devices using one or more antennas 401. The communications circuitry 402 may include circuitry that can operate the physical layer (PHY) communications and/or medium access control (MAC) communications for controlling access to the wireless medium, and/or any other communications layers for transmitting and receiving signals. The communication device 400 may also include processing circuitry 406 and memory 408 arranged to perform the operations described herein. In some embodiments, the communications circuitry 402 and the processing circuitry 406 may be configured to perform operations detailed in the above figures, diagrams, and flows.

In accordance with some embodiments, the communications circuitry 402 may be arranged to contend for a wireless medium and configure frames or packets for communicating over the wireless medium. The communications circuitry 402 may be arranged to transmit and receive signals. The communications circuitry 402 may also include circuitry for modulation/demodulation, upconversion/downconversion, filtering, amplification, etc. In some embodiments, the processing circuitry 406 of the communication device 400 may include one or more processors. In other embodiments, two or more antennas 401 may be coupled to the communications circuitry 402 arranged for sending and receiving signals. The memory 408 may store information for configuring the processing circuitry 406 to perform operations for configuring and transmitting message frames and performing the various operations described herein. The memory 408 may include any type of memory, including non-transitory memory, for storing information in a form readable by a machine (e.g., a computer). For example, the memory 408 may include a computer-readable storage device, read-only memory (ROM), random-access memory (RAM), magnetic disk storage media, optical storage media, flash-memory devices and other storage devices and media.

In some embodiments, the communication device 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 400 may include one or more antennas 401. The antennas 401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 400 may include one or more of a keyboard, a display, a non-volatile memory port, multiple antennas, a graphics processor, an application processor, speakers, and other mobile device elements. The display may be an LCD screen including a touch screen.

Although the communication device 400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 400 may refer to one or more processes operating on one or more processing elements.

Figure 5A:
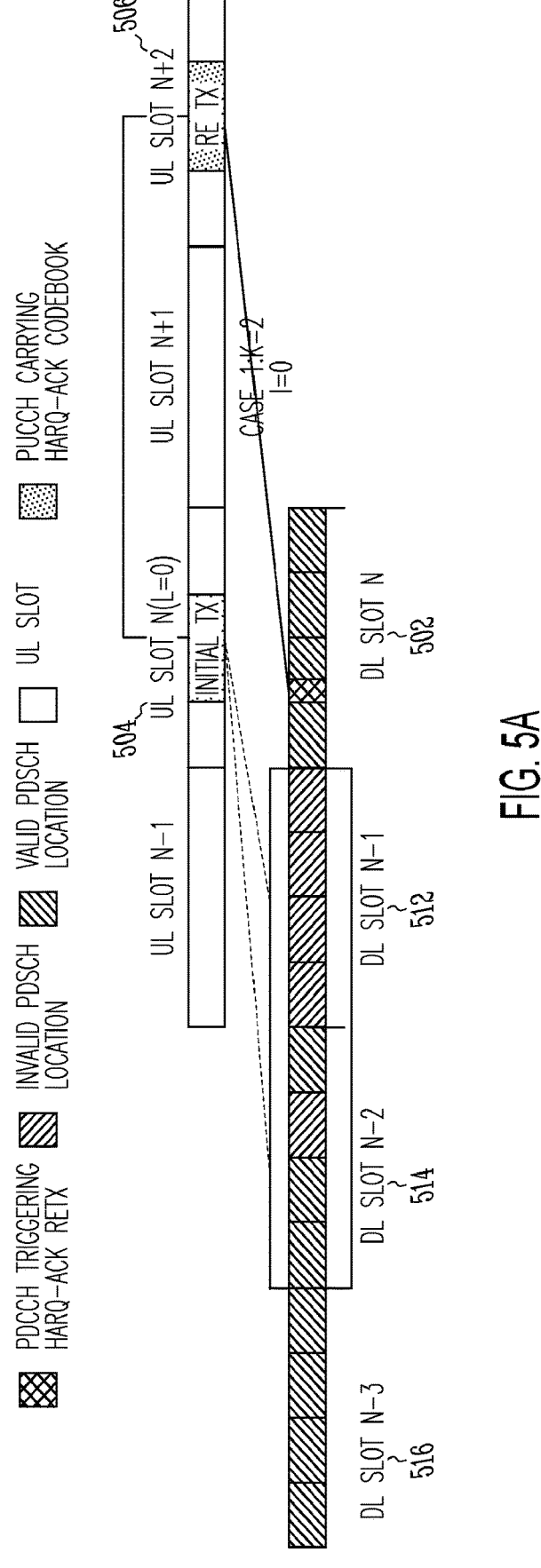
FIGS. 5A and 5B illustrate illustrated HARQ-ACK codebook retransmission, in accordance with some embodiments.
Figure 5B:
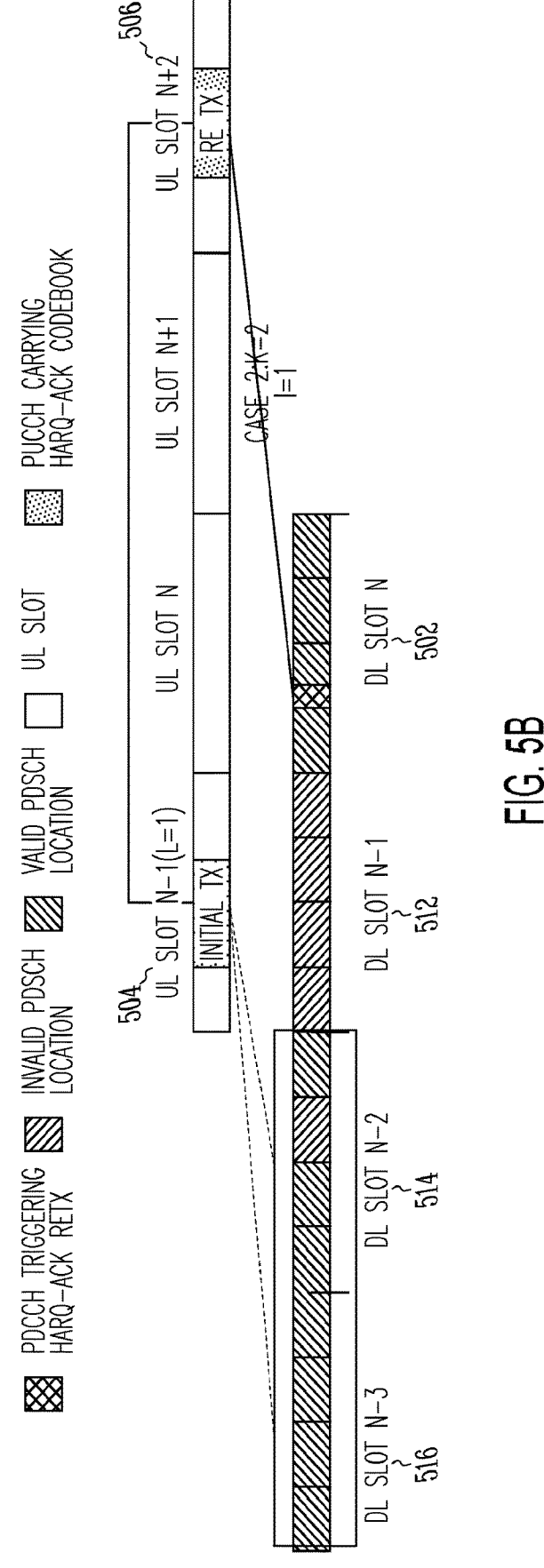

FIGS. 5A and 5B illustrate illustrated HARQ-ACK codebook retransmission, in accordance with some embodiments. In both 5A and 5B, a UE receives a DCI in the PDCCH in DL slot 502 (DL slot n) that triggers HARQ-ACK codebook retransmission in a same UL slot 506 (UL slot n+2) (i.e., k=2).

In FIG. 5A, the time offset is zero and therefor the HARQ-ACK codebook to be retransmitted was originally in UL slot n. In FIG. 5A, the retransmitted HARQ-ACK codebook is associated candidate DL slots and valid PDSCH locations within candidate DL slots 512 and 514. In the example of FIG. 5A, the HARQ-ACK codebook payload would be three bits corresponding to the three valid PDSCH locations that are illustrated.

In FIG. 5B, the time offset is one and therefor the HARQ-ACK codebook to be retransmitted was originally transmitted in UL slot n−1. In FIG. 5B, the retransmitted HARQ-ACK codebook is associated candidate DL slots and valid PDSCH locations within candidate DL slots 514 and 516. In the example of FIG. 5B, the HARQ-ACK codebook payload would be seven bits corresponding to the seven valid PDSCH locations that are illustrated.

In these embodiments, for a Type-1 HARQ-ACK codebook, the HARQ-ACK codebook payload is based on candidate DL slots and valid PDSCH locations within each candidate DL slot (i.e., sum of number of valid PDSCHs within all candidate DL slots).

In some embodiments, with reference to slots of PUCCH transmissions on the primary cell and for Type-1 or Type-2 HARQ-ACK codebooks, a UE that transmitted or would transmit a PUCCH or a PUSCH with a first HARQ-ACK codebook in slot m can be indicated by a DCI format with CRC scrambled by a C-RNTI or a MCS-C-RNTI that does not schedule a PDSCH reception and is received in a PDCCH ending in slot n, to transmit a PUCCH with the first HARQ-ACK codebook in slot n+k, where slot n+k is after slot m. The UE determines k and a resource for the PUCCH transmission.

In these embodiments, m represents the slot of the original transmission of codebook, n represents the ending slot of PUCCH in which DCI was received (i.e., the slot triggering retransmission of the codebook), k represents the slot offset (i.e., the number of slots after slot in in which the codebook is to be retransmitted, and 1 represents the time offset indicated in DCI format.

In some embodiments, if the pdsch-HARQ-ACK-retx or pdsch-HARQ-ACK-retxDCI-1-2 field value in the DCI format 1_1 or 1_2, respectively, is '1', the UE determines slot m as m=n−1 where 1 is determined by a one-to-one mapping in ascending order among the values of the MCS field in the DCI format 1_1 or 1_2 and the values from −7 to 24. If the DCI format 1_1 or 1_2 includes a priority indicator field having a value, a priority value of first HARQ-ACK information in the first HARQ-ACK codebook is same as the value of the priority indicator field; otherwise, the priority value of the first HARQ-ACK information is zero.

In some embodiments, a PDSCH-Config IE may be used to configure the UE specific PDSCH parameters. In these embodiments, when pdsch-HARQ-ACK-RetxDCI-1-2 is configured, DCI format 1_2 can request the UE to perform a HARQ-ACK re-transmission on a PUCCH resource. In some embodiments, RRC configuration information element may be used to configure cell-group specific L1 parameters. In some embodiments, when pdsch-HARQ-ACK-Retx, pdsch-HARQ-ACK-RetxSecondaryPUCCHgroup is configured, DCI format 1_1 can request the UE to perform a HARQ-ACK re-transmission on a PUCCH resource in the primary PUCCH group and the secondary PUCCH group, respectively.

In some embodiments, a user equipment (UE) configured for operation in a fifth-generation (5G) new radio (NR) network may be configured for Hybrid Automatic Repeat Request Acknowledgement (HARQ-ACK) codebook determination. In these embodiments, the UE may decode a downlink control information (DCI) format received from a generation Node B (gNB). When the DCI format triggers HARQ-ACK codebook retransmission, the UE may determine a HARQ-ACK codebook to be retransmitted based on a time-offset indicated in the DCI format. The UE may also encode a physical uplink control channel (PUCCH) to include the HARQ-ACK codebook determined to be retransmitted. These embodiments are described in more detail below.

In some embodiments, the DCI format may be received in a physical downlink control channel (PDCCH) ending in a downlink (DL) slot (i.e., slot n) 502 (see FIGS. 5A and 5B). In these embodiments, to determine the HARQ-ACK codebook to be retransmitted, the UE may determine an uplink (UL) slot (i.e., slot m) 504 that included an initial transmission of the HARQ-ACK codebook based on subtracting the time-offset (l) from the DL slot (i.e., slot n) 502 (i.e., the UE determines slot m as m=n−l). In these embodiments, UE may determine which HARQ-ACK codebook is to be retransmitted from a plurality of initially transmitted HARQ-ACK codebooks based on the time-offset indicated in the DCI format. In some embodiments, the time-offset (l) may be determined based on values in a modulation and coding scheme (MCS) field in the DCI format, although the scope of the embodiments is not limited in this respect.

In some embodiments, the UL slot (i.e., slot m) 504 that included the initial transmission of the HARQ-ACK codebook is a first UL slot. In these embodiments, UE may also be configured to determine a second UL slot (i.e., slot n+k) 506 for the retransmission of the HARQ-ACK codebook based on a slot-offset (i.e., k) with respect to the DL slot i.e., slot n) 502. (i.e., the UE determines the slot for retransmission of HARQ-ACK codebook as slot n+k).

In the example illustrated in FIG. 5A, the time-offset (l) has a value of zero and therefore the HARQ-ACK codebook that was transmitted in slot UL slot n−0 (i.e., UL slot n) is to be retransmitted in UL slot 506. In the example illustrated in FIG. 5B, the time-offset (l) has a value of one and therefore the HARQ-ACK codebook that was transmitted in slot UL slot n−1 is to be retransmitted in UL slot 506.

In some embodiments, the DCI format may be a DCI format for scheduling physical downlink shared channel (PDSCH) HARQ-ACK retransmissions and comprises one of DCI format 1_1 and DCI format 1_2.

In some embodiments, the DCI format includes a PDSCH HARQ-ACK transmission indicator (pdsch-HARQ-ACK-retx). In these embodiments, when the UE is configured by radio-resource control (RRC) signalling, the PDSCH HARQ-ACK transmission indicator requests the UE to perform a HARQ-ACK retransmission on a PUCCH resource. In some embodiments, the RRC signalling may comprise a PDSCH configuration information element (PDSCH-Config IE) for configuring the UE with specific PDSCH parameters.

In some embodiments, when the DCI format further includes a priority indicator field having a value, the value indicates a priority of HARQ-ACK information in the initial transmission of the HARQ-ACK codebook, the value indicating a priority of HARQ-ACK information for the retransmission of the HARQ-ACK codebook triggered by the DCI format.

In some embodiments, when the DCI format does not include a priority indicator field, the priority of the HARQ-ACK information for the retransmission of the HARQ-ACK codebook is zero. In these embodiments, a bit field with one bit to represent priority can be configured to be present or not in the DCI. If this bit field is configured, then, '0' is for lower priority (LP), and '1' is for higher priority (HP). If this bit field is not configured (i.e., when the DCI format includes a priority indicator field not having a value), lower priority is assumed by, which is equivalent to '0'. Accordingly, the gNB can only trigger a retransmission of a LP HARQ-ACK when the field is not configured. In other words, if the gNB uses a DCI format without this bit field, the gNB can only trigger a PUCCH slot m which carriers LP HARQ-ACK and the LP HARQ-ACK will be retransmitted. On the other hand, a gNB is not able to use a DCI format without this bit field to trigger a PUCCH slot m which carriers HP HARQ-ACK.

In some embodiments, the UE may also be configured to generate the HARQ-ACK codebook based on valid PDSCH locations in one or more candidate DL slots. The UE may also be configured to transmit an initial PUCCH carrying the initial transmission of the HARQ-ACK codebook in the first UL slot (i.e., slot m) 504, and transmit a second PUCCH carrying the retransmission of the HARQ-ACK codebook in the second UL slot (i.e., slot n+k) 506.

In the example illustrated in FIG. 5A, the HARQ-ACK codebook that is to be retransmitted was generated based on valid PDSCH locations DL slot n−2 514 and DL slot n−1 512. In this example, there are three valid PDSCH locations DL slot n−2 514 and DL slot n−1 512 and therefore the HARQ-ACK payload may be three bits. In the example illustrated in FIG. 5B, the HARQ-ACK codebook that is to be retransmitted was generated based on valid PDSCH locations DL slot n−3 516 and DL slot n−2 514. In these example, there are sever valid PDSCH locations DL slot n−3 516 and DL slot n−2 514 and therefore the payload may be seven bits. To generate the HARQ-ACK codebook, the UE may decode the PDSCH received at the valid locations, although the scope of the embodiments is not limited in this respect.

In some embodiments, the HARQ-ACK codebook may be generated based on one of a Type 1 and a Type 2 HARQ-ACK codebook determination. In these embodiments, for the Type 1 HARQ-ACK codebook determination, the HARQ-ACK codebook may be a semi-static fixed size codebook. In these embodiments, for the Type 2 HARQ-ACK codebook determination, the HARQ-ACK codebook may be a dynamic codebook. In some embodiments, the HARQ-ACK codebook may be generated for a downlink transmission scheduled in semi-persistent scheduling (SPS) resources, although the scope of the embodiment is not limited in this respect.

In some embodiments, the UE may include processing circuitry which may comprise a baseband processor, and In these embodiments, the PDCCH may be received by the UE with a two or more antennas. The UE may also include memory configured to store the HARQ-ACK codebook that is determined to be retransmitted.

Some embodiments are directed to a non-transitory computer-readable storage medium that stores instructions for execution by processing circuitry of a user equipment (UE) configured for Hybrid Automatic Repeat Request Acknowledgement (HARQ-ACK) codebook determination operation in a fifth-generation (5G) new radio (NR) network. In these embodiments, the processing circuitry may be configured to decode a downlink control information (DCI) format received from a generation Node B (gNB). When the DCI format triggers HARQ-ACK codebook retransmission, the processing circuitry may be configured to determine a HARQ-ACK codebook to be retransmitted based on a time-offset indicated in the DCI format and encode a physical uplink control channel (PUCCH) to include the HARQ-ACK codebook determined to be retransmitted.

Some embodiments are directed to generation Node B (gNB) configured for operation in a fifth-generation (5G) new radio (NR) network. In these embodiments, for a user equipment (UE) configured for Hybrid Automatic Repeat Request Acknowledgement (HARQ-ACK) codebook determination, the gNB may determine a HARQ-ACK codebook to be retransmitted by the UE and encode a downlink control information (DCI) format for transmission the UE triggering HARQ-ACK codebook retransmission. In these embodiments, the DCI format may be encoded to include a time-offset for use by the UE to determine the HARQ-ACK codebook that is to be retransmitted. The gNB may decode a physical uplink control channel (PUCCH) that includes the retransmitted HARQ-ACK codebook.

In some embodiments, the DCI format may be transmitted in a physical downlink control channel (PDCCH) ending in a downlink (DL) slot (i.e., slot n) 502. In these embodiments, the time-offset (l) may be based a difference between the DL slot (i.e., slot n) 502 and an uplink (UL) slot (i.e., slot m) 504 that included an initial reception of the HARQ-ACK codebook (i.e., the UE determines slot m as m=n−1), and therefore the gNB determines/as l=n−m).

In some embodiments, the gNB may encode the DCI to include a slot-offset (i.e., k) with respect to the DL slot i.e., slot n) 502 to allow the UE to determine a second UL slot (i.e., slot n+k) 506 for the retransmission of the HARQ-ACK codebook based on the slot-offset (i.e., k) with respect to the DL slot i.e., slot n) 502 (i.e., the UE determines the slot for retransmission of HARQ-ACK codebook as slot n+k).

EXAMPLES

Example 1: A system and methods of enhanced UE HARQ feedback for NR comprising: configuring, by gNB, of SPS HARQ-ACK deferral and PUCCH repetition over slots and sub-slots; executing, by the UE, of the deferral of SPS HARQ-ACK considering PUCCH repetitions; configuring and requesting, be the gNB, of retransmission of PUCCH from a prior slot or sub-slot; and transmitting, by the UE, of the PUCCH retransmission.

Example 2: A method of example 1, wherein the number of repetitions to be checked for validity may be configured by higher layers from 1 up to (maximum) # of PUCCH repetitions. Further, the number of repetitions to be checked for validity may be defined relative to the total number of repetitions the PUCCH was originally scheduled or configured for, e.g., the number of repetitions to be checked for validity could be determined as floor (f*R) where 'f' is a configured or specified factor and 'R' is the total number of PUCCH repetitions.

Example 3: A method of example 1, wherein if a UE is configured with slot-based or sub-slot based PUCCH repetitions, and is indicated with more than one PUCCH repetition, and if the corresponding SPS HARQ-ACK carried by the repetition is enabled with deferral, only conditions for mapping of the initial PUCCH repetition from the multiple PUCCH repetitions may be checked for deferral.

Example 4: A method of example 1, wherein if a UE is configured with slot-based or sub-slot based PUCCH repetitions, and is indicated with more than one PUCCH repetition, and if the corresponding SPS HARQ-ACK carried by the repetition is enabled with deferral, conditions for mapping of all PUCCH transmission from the multiple PUCCH transmissions may be checked for deferral. I.e., only when all PUCCH repetitions can be mapped to valid UL slots/sub-slots, the deferral is not further performed.

Example 5: A method of example 1, wherein if a UE is configured with slot-based or sub-slot based PUCCH repetition, and is indicated with more than one PUCCH repetition, and if the corresponding SPS HARQ-ACK carried by the repetition is enabled with deferral, conditions for mapping of each PUCCH transmission from the multiple PUCCH transmissions may be checked for deferral. The deferral is not performed when at least X PUCCH repetitions could be mapped to valid UL slots/sub-slots. Here X may be fixed to one or may be configurable from 1 up to # of PUCCH repetitions.

Example 6: A method of example 1, wherein if SPS HARQ-ACK is configured with deferral enabled, a UE does not multiplex different UCI types in a PUCCH transmission with repetitions over $$N_{PUCCH}^{repeat} > 1$$

slots. If a UE would transmit a first PUCCH over more than one slot and at least a second PUCCH over one or more slots, and the transmissions of the first PUCCH and the second PUCCH would overlap in a number of slots, then, for each slot of the number of slots and with UCI type priority of HARQ-ACK>SR>CSI with higher priority>CSI with lower priority.

Example 7: A method of example 6, wherein when one of UCIs contain SPS HARQ-ACJ with enabled deferral, the UE can expect the first PUCCH and any of the second PUCCHs to start at a same slot and include a UCI type with same priority. In this case, one of the following dropping rules may be applied:

If there are UCI of different types with the same priority, the UCI containing SPS HARQ-ACK is dropped, and the other UCI is transmitted Or, if there are UCI of different types with the same priority, the UCI containing SPS HARQ-ACK is kept, and the other UCI is dropped.

Example 8: A method of example 1, when a PUCCH is triggered for retransmission by a DCI, for Type 2 CB, additional total DAI or continuous counter DAI may be used to derive CB size of the PUCCH in the indicated slot/sub-slot for retransmission.

Example 9: A method of example 1, when a PUCCH is triggered for retransmission by a DCI, for Type 2 CB, DCI with retransmission of HARQ-ACK codebook may indicate an additional time offset to past from the PUCCH resource for the new HARQ-ACK, and the UE in this case is assumed to continue the CB construction from the indicated PUCCH resource in past to the PUCCH resource in future.

Example 10: A method of example 9, wherein the UE assumes that the previous or original PUCCH resource is to be used for the retransmission, and it continues to count HARQ-ACK bits using counter DAI and total DAI including the DAIs from the DCI requesting PUCCH retransmission.

Example 11: A method of example 9, wherein the time offset may be indicated in terms of numbers of slots corresponding to the subcarrier spacing (SCS) of the active UL BWP where the PUCCH is mapped.

Example 12: A method of example 9, wherein further, to be able to distinguish from multiple PUCCH resources in a slot that may be impacted, the reference to one of possibly multiple PUCCHs can be provided to the UE via a combination of the slot offset referring to the earlier slot and a PUCCH Resource Indication (PRI) for the indicated slot.

Example 13: A method of example 9, wherein the UE in this case may not expect that the same HARQ process ID for a CC is indicated in the new DCI and is associated with the HARQ codebook payload in the retransmitted PUCCH.

Example 14: A method of example 9, when a PUCCH is triggered for retransmission by a DCI, a UE may not be expected to be requested to retransmit PUCCH of a first priority by DCI indication containing a second priority, i.e., triggering of PUCCH retransmission by a DCI of a different priority is not supported.

Example 15: A method of example 9, when a PUCCH is triggered for retransmission by a DCI, for the same codebook type, the codebook size may still be an issue, for type-1 codebook. For type-1 codebook, there is one special case that UE only transmits 1 bit HARQ-ACK or only HARQ-ACK for SPS PDSCH, when UE does not receive any DCI, or receives only one DCI with DCI 1_0 with specific DAI value. For other cases, UE generates Type-1 codebook (typically much larger size). One way to avoid such ambiguity is to always generate type-1 codebook for dropped PUCCH (even if UE only has SPS PDSCH HARQ-ACK to transmit, or only receives one DCI with DCI 1_0 with specific DAI value).

Example 16: A method of example 1, wherein for SPS with priority i configured with spsHARQdeferral (i.e. when SPS HARQ-ACK deferral is activated for the SPS configuration), a UE determines whether to defer the SPS HARQ-ACK from a first slot to a second slot.

Example 17: A method of example 15, when for SPS HARQ-ACK with a priority i, after resolving the overlapped PUCCH/PUSCHs with different priorities (if any), and if the UE would be transmitting the SPS HARQ-ACK using the PUCCH SPS-PUCCH-AN-List-r16 or n1PUCCH-AN which is not valid, the SPS HARQ-ACK with the priority i is deferred.

Example 18: A method of example 15, when for SPS HARQ-ACK with a priority i, after resolving the overlapped PUCCH/PUSCHs with different priorities (if any), and if the UE would be transmitting the SPS HARQ-ACK using the PUCCH SPS-PUCCH-AN-List-r16 configured for priority i or n1PUCCH-AN configured for priority i which is not valid, the SPS HARQ-ACK with the priority i is deferred.

Example 19: A method of example 15, when for SPS HARQ-ACK with a priority i, after resolving the overlapped PUCCH/PUSCHs with same priority (step 1), and if the UE would be transmitting the SPS HARQ-ACK using the PUCCH SPS-PUCCH-AN-List-r16 with the priority i or n1PUCCH-AN with the priority i which is not valid, the SPS HARQ-ACK with the priority i is deferred.

The Abstract is provided to comply with 37 C.F.R. Section 1.72 (b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation (5G) new radio (NR) network, the apparatus comprising: processing circuitry; and memory, the UE configured for Hybrid Automatic Repeat Request Acknowledgement (HARQ-ACK) codebook determination, wherein the processing circuitry is to decode a downlink control information (DCI) format received from a generation Node B (gNB), wherein when the DCI format triggers HARQ-ACK codebook retransmission, the processing circuitry is configured to:

determine a HARQ-ACK codebook to be retransmitted based on a time-offset indicated in the DCI format; and encode a physical uplink control channel (PUCCH) to include the HARQ-ACK codebook determined to be retransmitted, wherein the DCI format is received in a physical downlink control channel (PDCCH) ending in a downlink (DL) slot, and wherein to determine the HARQ-ACK codebook to be retransmitted, the processing circuitry is configured to determine an uplink (UL) slot that included an initial transmission of the HARQ-ACK codebook based on subtracting the time-offset from in the DL slot, wherein the UL slot that included the initial transmission of the HARQ-ACK codebook is a first UL slot, and wherein the processing circuitry is further configured to determine a second UL slot for the retransmission of the HARQ-ACK codebook based on a slot-offset with respect to the DL slot, wherein the DCI format is a DCI format for scheduling physical downlink shared channel (PDSCH) HARQ-ACK retransmissions and comprises one of DCI format 1_1 and DCI format 1_2, wherein the DCI format includes a PDSCH HARQ-ACK transmission indicator (pdsch-HARQ-ACK-retx), and wherein when the UE is configured by radio-resource control (RRC) signalling, the PDSCH HARQ-ACK transmission indicator requests the UE to perform a HARQ-ACK retransmission on a PUCCH resource, wherein when the DCI format further includes a priority indicator field having a value, the value indicates a priority of HARQ-ACK information in the initial transmission of the HARQ-ACK codebook, the value indicating a priority of HARQ-ACK information for the retransmission of the HARQ-ACK codebook triggered by the DCI format, wherein when the DCI format does not include a priority indicator field, the priority of the HARQ-ACK information for the retransmission of the HARQ-ACK codebook is zero, and wherein the memory is configured to store the HARQ-ACK codebook.

2. The apparatus of claim 1, wherein the processing circuitry is to configure the UE to:

determine the HARQ-ACK codebook for the initial transmission based on PDSCH receptions in one or more candidate DL slots;

transmit an initial PUCCH carrying the initial transmission of the HARQ-ACK codebook in the first UL slot; and transmit a second PUCCH carrying the retransmission of the HARQ-ACK codebook in the second UL slot.

3. The apparatus of claim 2, wherein the HARQ-ACK codebook is generated based on one of a Type 1 and a Type 2 HARQ-ACK codebook determination, wherein for the Type 1 HARQ-ACK codebook determination, the HARQ-ACK codebook is a semi-static codebook, and wherein for the Type 2 HARQ-ACK codebook determination, the HARQ-ACK codebook is a dynamic codebook.

4. The apparatus of claim 1, wherein the processing circuitry comprises a baseband processor, and wherein the PDCCH is received by the UE with a two or more antennas.

5. A non-transitory computer-readable storage medium that stores instructions for execution by processing circuitry of a user equipment (UE) configured for Hybrid Automatic Repeat Request Acknowledgement (HARQ-ACK) codebook determination operation in a fifth-generation (5G) new radio (NR) network, wherein the processing circuitry is to decode a downlink control information (DCI) format received from a generation Node B (gNB), when the DCI format triggers HARQ-ACK codebook retransmission, the processing circuitry is configured to:

determine a HARQ-ACK codebook to be retransmitted based on a time-offset indicated in the DCI format; and encode a physical uplink control channel (PUCCH) to include the HARQ-ACK codebook determined to be retransmitted, wherein the DCI format is received in a physical downlink control channel (PDCCH) ending in a downlink (DL) slot, and wherein to determine the HARQ-ACK codebook to be retransmitted, the processing circuitry is configured to determine an uplink (UL) slot that included an initial transmission of the HARQ-ACK codebook based on subtracting the time-offset from in the DL slot, wherein the UL slot that included the initial transmission of the HARQ-ACK codebook is a first UL slot, and wherein the processing circuitry is further configured to determine a second UL slot for the retransmission of the HARQ-ACK codebook based on a slot-offset with respect to the DL slot, wherein the DCI format is a DCI format for scheduling physical downlink shared channel (PDSCH) HARQ-ACK retransmissions and comprises one of DCI format 1_1 and DCI format 1_2, wherein the DCI format includes a PDSCH HARQ-ACK transmission indicator (pdsch-HARQ-ACK-retx), and wherein when the UE is configured by radio-resource control (RRC) signalling, the PDSCH HARQ-ACK transmission indicator requests the UE to perform a HARQ-ACK retransmission on a PUCCH resource, wherein when the DCI format further includes a priority indicator field having a value, the value indicates a priority of HARQ-ACK information in the initial transmission of the HARQ-ACK codebook, the value indicating a priority of HARQ-ACK information for the retransmission of the HARQ-ACK codebook triggered by the DCI format, wherein when the DCI format does not include a priority indicator field, the priority of the HARQ-ACK information for the retransmission of the HARQ-ACK codebook is zero.

* * * * *